US 9,738,796 B1

(12) United States Patent
Bury et al.

(10) Patent No.: US 9,738,796 B1
(45) Date of Patent: Aug. 22, 2017

(54) ACOUSTICALLY TRANSPARENT COATING

(71) Applicant: USG Interiors, LLC, Chicago, IL (US)

(72) Inventors: Rafael Bury, Wheeling, IL (US); Donghong Li, Buffalo Grove, IL (US); Samuel D. Hulka, Mount Prospect, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 15/258,159

(22) Filed: Sep. 7, 2016

(51) Int. Cl.
| | |
|---|---|
| *C09D 7/02* | (2006.01) |
| *C09D 7/00* | (2006.01) |
| *C09D 121/02* | (2006.01) |
| *C09D 7/12* | (2006.01) |
| *B05D 1/02* | (2006.01) |
| *E04B 1/84* | (2006.01) |
| *G10K 11/168* | (2006.01) |
| *C08K 7/28* | (2006.01) |
| *C08K 3/40* | (2006.01) |
| *C08K 3/22* | (2006.01) |
| *C08K 3/26* | (2006.01) |
| *C08K 3/34* | (2006.01) |

(52) U.S. Cl.
CPC ............ *C09D 7/002* (2013.01); *B05D 1/02* (2013.01); *C09D 7/1216* (2013.01); *C09D 121/02* (2013.01); *E04B 1/8409* (2013.01); *G10K 11/168* (2013.01); *C08K 3/34* (2013.01); *C08K 3/40* (2013.01); *C08K 7/28* (2013.01); *C08K 2003/2241* (2013.01); *C08K 2003/265* (2013.01)

(58) Field of Classification Search
CPC .... C09D 7/002; C09D 7/1216; C09D 121/02; B05D 1/02; E04B 1/8409; G10K 11/168
See application file for complete search history.

(56) References Cited

U.S. PATENT DOCUMENTS

| | | | | |
|---|---|---|---|---|
| 4,040,213 | A * | 8/1977 | Capaul ................. | E04B 1/8409 181/291 |
| 4,346,782 | A * | 8/1982 | Bohm ................... | B05D 7/54 181/207 |
| 6,379,454 | B1 * | 4/2002 | Fellert ................... | C04B 28/02 106/698 |
| 6,749,920 | B1 * | 6/2004 | Caldwell ............. | C08K 3/0008 181/287 |
| 8,551,572 | B1 * | 10/2013 | Tait ..................... | C09D 133/062 239/337 |
| 8,684,134 | B2 | 4/2014 | Dugan et al. | |
| 8,770,345 | B2 | 7/2014 | Dugan et al. | |
| 8,925,677 | B2 | 1/2015 | Dugan et al. | |
| 8,931,230 | B2 | 1/2015 | Negri et al. | |
| 9,279,054 | B2 | 3/2016 | Schoenfeld et al. | |
| 2007/0227814 | A1 * | 10/2007 | Schabel, Jr. ........... | B60R 13/08 181/288 |

* cited by examiner

*Primary Examiner* — Forrest M Phillips
(74) *Attorney, Agent, or Firm* — Pearne & Gordon LLP

(57) ABSTRACT

A formulation for an acoustically transparent coating for use on an acoustical substrate comprising a water dispersible binder and relatively large filler particles, and characterized by a high pigment to volume concentration, high viscosity, high shear thinning, and fast drying to enable the formulation to be sprayed in droplets that retain their identity when in mutual contact.

16 Claims, 4 Drawing Sheets

ACOUSTICALLY TRANSPARENT COATING

BACKGROUND OF THE INVENTION

The invention relates to acoustically transparent coatings useful for improving the appearance of acoustical substrates.

PRIOR ART

U.S. Pat. Nos. 8,684,134, 8,770,345 and 8,925,677 disclose drywall sheets or panels used to construct monolithic acoustical ceilings. The panels are perforated and clad with a thin, porous, translucent web such as a non-woven translucent fiber glass veil or scrim. Joints between the panels can be finished with tape and joint compound in the same manner as ordinary drywall is taped per gypsum association publication GA-216-2013.

There is a need for a coating that can be applied across the drywall panels to conceal the taped joints and the perforations visible through the veil and that does not significantly diminish the sound absorption afforded by the panels. It is important that the coating can be applied without requiring excessive skill on the part of a painter or tradesman and that a full coating will dry within a limited time, preferably less than half of a single work day.

SUMMARY OF THE INVENTION

The invention provides a finish or appearance coating for an acoustical substrate that is characterized by a high porosity and a resulting high acoustical transparency. The coating is particularly useful for concealing the perforations in drywall sheets clad with a translucent or semi-transparent non-woven veil and taped joints between such sheets in a monolithic acoustical ceiling construction.

The disclosed coating material is adapted to be sprayed in droplet form in multiple layers that are allowed to dry before a successive layer is applied. The resulting coating structure is a three dimensional matrix of residual droplets and intervening voids or pores. The coating material is characterized by relatively large filler particles, high pigment volume concentration, substantial shear thinning, and fast drying properties.

The coating material is sprayed in a form of relatively large droplets. Owing to the physical properties of the material, the droplets retain at least some of their individual character once deposited on the substrate or the previous layer of the material. The droplets, due to their viscosity and quick drying properties, do not fully merge with adjacent droplets. The droplets retain sufficient individuality to provide open spaces between the droplets of the same coating layer as well as the previous coating layer. The open spaces, which are small enough to be overlooked by the unaided eyes of a casual observer in a ceiling application, interconnect through the separate coat layers providing a porosity through the entire thickness of the coating.

DESCRIPTION OF THE PREFERRED EMBODIMENT

Figure 1:
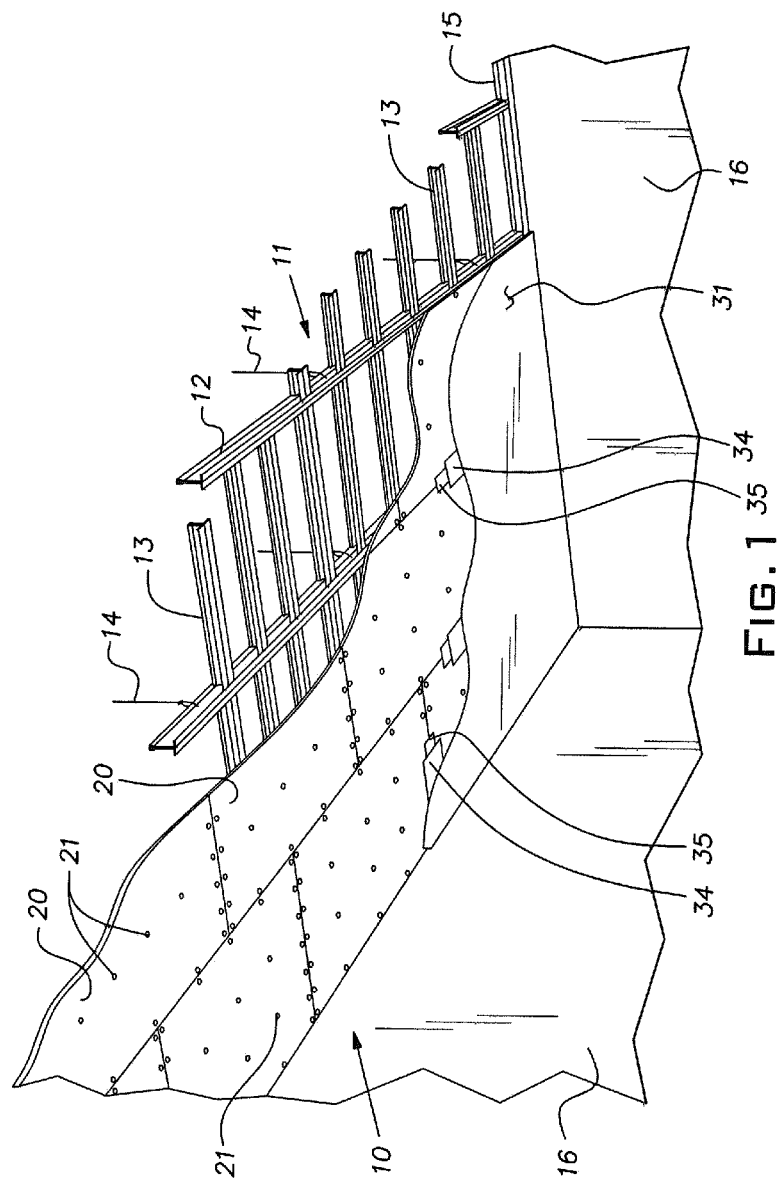
FIG. 1 is a fragmentary, schematic, isometric view of a gypsum panel acoustical monolithic ceiling employing the invention.

Referring now to FIG. 1, there is shown a schematic partial view of an acoustical monolithic ceiling installation 10. Portions of layers of the ceiling 10 are peeled away to reveal constructional details. The ceiling 10 is a suspended system including a drywall grid 11, known in the art, comprising main tees 12 spaced on 4 ft. centers and intersecting cross tees 13 spaced on 16 in. or 2 ft. centers. Dimensions used herein are typically nominal dimensions and are intended to include industry recognized metric equivalents. The main tees 12, to which the cross tees 13 are interlocked, are suspended by wires 14 attached to a superstructure (not shown). A perimeter of the grid 11 is conventionally formed by channel molding 15 secured to respective walls 16.

Acoustical panels 20 are attached to the lower sides of the grid tees 12, 13 with self-drilling screws 21. The illustrated acoustical panels are 4 ft. by 8 ft. in their planar dimensions, but can be longer, shorter and/or of different width as desired or practical. The size of the panel 20 and spacing of the grid tees 12 and 13, allows the edges of the panel to underlie and be directly attached to a grid tee, assuring that these edges are well supported.

Figure 2:
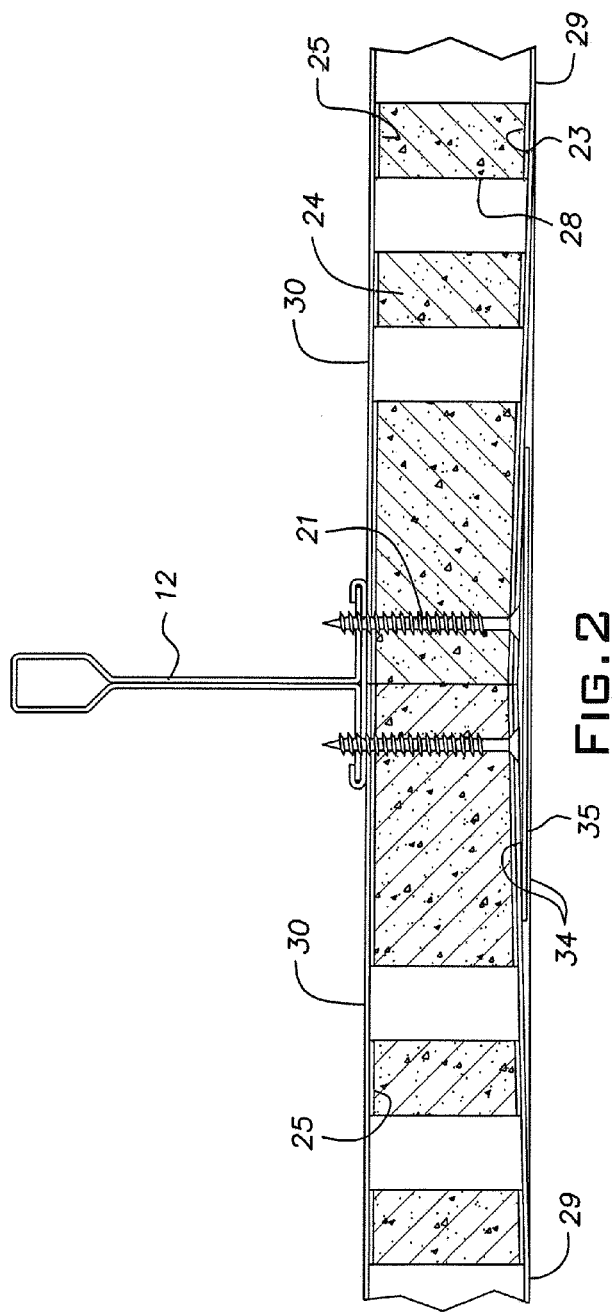
FIG. 2 is a fragmentary, cross-sectional view on an enlarged scale of the monolithic acoustical ceiling of FIG. 1.

Referring to FIG. 2, the acoustical panel 20 is characterized with a perforated gypsum core 24. One method of providing the core 24 is to modify a standard commercially available sheet of drywall by perforating it through a front paper face 23, the gypsum core 24, and a rear paper side or face 25. Perforations 28 can be formed by drilling, punching, or with other known hole-making techniques. The perforations 28 are preferably uniformly spaced; by way of an example, the perforations can be round holes of 8 mm diameter on 16 mm centers. This arrangement produces a total area of the perforations substantially equal to 20% of the full planar area of a panel 20. Other hole sizes, shapes, patterns and densities can be used. For example, tests have shown that a hole density of 9% of the total area can achieve good results. Marginal areas, as well as intermediate areas corresponding to centers of support grid, joists, or studs, of a sheet can be left unperforated to maintain strength at fastening points.

Sheets 29, 30 are laminated to both full sides of the perforated drywall sheet thereby at least partially closing both ends of the perforations 28. At a rear side of the drywall, the backer sheet or web 30 is preferably an acoustically absorbent non-woven fabric known in the acoustical ceiling panel art. By way of example, the backer fabric can be that marketed under the trademark SOUNDTEX® by Freudenberg Vliesstoffe KG.

At a front side of the drywall sheet 22, a sheet or web in the form of a non-woven fabric scrim layer 29 is attached with a suitable adhesive. The facing layer or sheet 29 is porous; a suitable material for this application is that used commercially as a cover or face for conventional acoustical ceiling panels. An example of this type of veil material is that marketed by Owens Corning Veil Netherlands B.V. under the product code A125 EX-CH02.

The panel 20 with other identical panels is hung on the grid 11 in the same manner as ordinary drywall is installed. Similarly, as shown in FIG. 1, joints 33 are taped in the same way as regular drywall is taped. Drywall joint compound or similar material 34 is used to adhere a tape or similar material 35 to adjacent margins of two abutting panels 20 by applying it directly to the sheets 29 and over the tape 35 to conceal the tape.

After the joint compound 34 has been sanded or sponged smooth, the front sheets 29 and remaining joint compound are painted with an acoustically transparent coating 31 of the invention. When the term monolithic is used herein, it is to denote that essentially the entire visible surface of a ceiling or wall appears to be a seamless expanse without joints.

The coating 31, in accordance with the invention, is sprayed onto the room facing side of the panels 20 clad with the scrim or veil 29 which constitute a substrate for the coating. The coating 31, ideally, has several physical properties including relatively large filler particles, high pigment volume concentration (PVC), high viscosity, shear thinning, and fast drying performance. When used as an appearance coat for ceiling structures, the coating 31 should dry white.

A formulation for a suitable coating includes a binder and relatively large particles serving as a pigment or filler of a size larger than that ordinarily used in conventional paint-like coatings. The binder can be a resin or polymer binder in or useable as an aqueous dispersion such as, but not limited to, acrylic, styrene, or vinyl polymer latex or oil-based media such as an alkyd, polyurethane, polyester, or epoxy and combinations thereof.

The relatively large particles include, but are not limited to, glass spheres, perlite, ceramic, fly ash, polymeric spheres, borosilicate, coarse sand, silica, and coarse carbonate. The relatively large particles are spherical or three-dimensional in shape without a prominent plate-like character or without a primarily columnar shape. The size of the large particles can range between 20 and 900 microns.

Table 1 below sets out an example of a suitable formula for the inventive acoustically transparent coating 31.

TABLE 1

| MATERIALS | SOURCE | WEIGHT % | WEIGHT % RANGE | FUNCTION |
|---|---|---|---|---|
| Water | | 37.49 | (10-70) | Solvent |
| Natrosol HHXR | DOW Chemical | 0.41 | (0-2) | Thickener |
| Tamol 1254 | DOW Chemical | 0.29 | | Dispersant |
| Titanium Dioxide | Tioxide | 6.11 | | Filler |
| Haltech HP 42-296 | Haltech | 15.97 | (0.05-80) | Latex Binder |
| Calcium Carbonate | Omya | 29.60 | (0-60) | Filler |
| Mica P80F | USG | 3.70 | | Filler |
| Troykyd D01 | Troy Chemical | 0.19 | | Defoamer |
| Texanol | Eastman Chemical Co. | 0.37 | | Coalescent |
| Mergal 174 II | Troy Chemical | 0.16 | (0-0.3) | Biocide |
| 3M K1 | 3M | 5.70 | (1-25) | Filler |
| | | 100.00 | | |

The function or role of the various constituents is noted in the column on the far right. Water, thickener, binder and large particle filler are essential and the biocide is essential while the formula resides in a can. The remaining constituents can be considered optional. For reference purposes, the titanium dioxide has an average particle size of about 0.6 microns; the calcium carbonate can have an average particle size of about 12 microns, and the plate-like mica can have major dimensions of about 20 microns.

The 3M K1 material is glass bubbles (hollow spheres) of soda-lime borosilicate with a reported true density of typically 0.125 grams/cc. and an average particle size of 65 microns. The 3M K1 material is particularly useful in practice of the invention. This material occupies much of the volume of the formulation owing to its relatively low density resulting from its hollow sphere structure. The K1 material, additionally, has a relatively low oil absorption of 0.2-0.6 grams oil/cc of product per ASTM D281-84. Still further, the K1 material has a natural white color which is useful in ceiling applications. The titanium dioxide serves as an opacity improving filler and whitening pigment. The calcium carbonate increases the solids and density of the coating to further improve drying time and hardness of the dried coating.

The pigment volume concentration (PVC) of the coating formulation, based on all the solids, is relatively high and ideally is between 75% and 95% while alternative formulations will fall in a wider range of about 50% to about 99%. Generally, there is insufficient binder when the coating is dry to fill the voids between the particles in the coating allowing air gaps in the coating. The ratio of the volume of relatively large particle fillers to fillers of more conventional lesser size can range between about 0.1 to about 10.

The coating formulation of Table 1 has a relatively high viscosity of about 190 BBU (Brabender Units) to about 265 BBU at room temperature. Alternative formulations can have a viscosity of between about 66 BBU to about 1450 BBU at room temperature.

Figure 4:
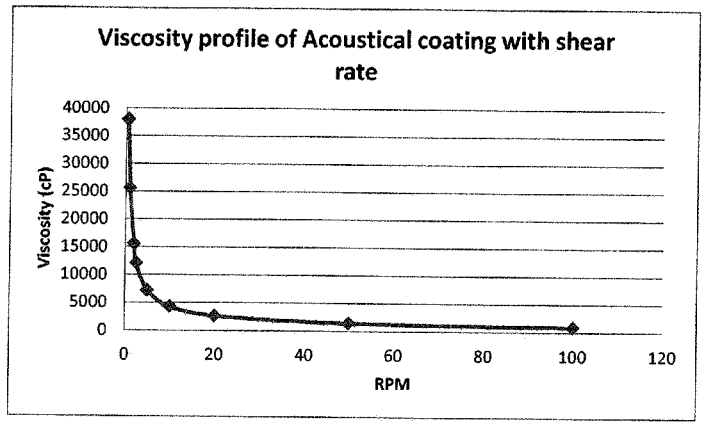
FIG. 4 is a graph of the viscosity of a preferred formula of the inventive coating.

The coating formulation of Table 1 is, and alternative formulations should be, characterized by a high rate of shear thinning. The shear thinning characteristics of the Table 1 formulation is shown in FIG. 4 where by the measured viscosity drops more than 40:1. The viscosity, in part, is contributed by the thickener component of the formulation. The listed thickener is cellulosic, but known synthetic and natural thickeners can be used. The thickener also serves to keep the constituents in suspension. The viscosity chart of FIG. 4 was measured on a Brookfield HA viscometer using a T-bar:C spindle. Alternative coating formulations should have a high shear thinning property so that the viscosity can reduce by a factor of at least 10 to 1 under shear conditions.

The coating of Table 1 or an equivalent is preferably applied to the taped veil clad, perforated drywall panels or other substrate in a spray process of separately sprayed layers. Each layer or coat is allowed to substantially dry before a subsequent coat is applied. Preferably, the wet coating material is sprayed in large droplets using, for example, a conventional hopper texture sprayer such as that marketed by Graco. Ideally, the gun and/or its air supply is adjusted so that the droplets are about 1 to about 4 mm. in size and, preferably, about 2 mm. in size. The shear thinning property, demonstrated in FIG. 4, of the wet coating allows it to be readily sprayed in droplet form despite its high viscosity. A single coating layer should involve spraying the substrate in two perpendicular directions or passes so that a uniform covering by the layer is achieved. Two to seven layers can be applied, with four layers being preferred, to conceal the perforations and taped joints of the ceiling. Coverage by the total coating layers can be between 15 to 35 square foot per gallon, with 25 square foot being preferred. The formulation of Table 1 or a like formulation has a density of 4 to 11 lbs. per gallon with a preferred range of 5 to 6.5 lbs. per gallon.

Figure 3:
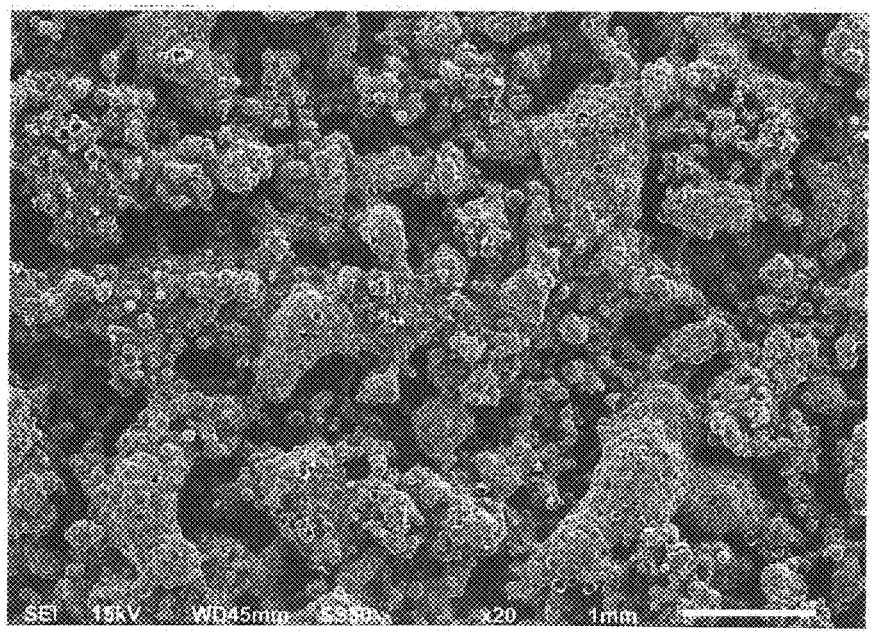
FIG. 3 is a scanning electron microphotograph of a face of the inventive coating.

FIG. 3 demonstrates the porous nature of the inventive coating when applied to an acoustical substrate.

Inspection of FIG. 3 shows that the droplets retain an individual nature while the binder bonds the solids to the substrate at the first layer and to adjacent droplets between and among layers. The scale on the lower right-hand corner of FIG. 3 indicates a measure of 1 mm. and droplets can be observed in the FIG. measuring more or less than 1 mm. Preferably, the dried droplets range between ½ and 2½ mm. The original droplet size will shrink when the water content evaporates.

As layers of the coating are deposited, a three-dimensional matrix of droplets is built-up. Voids, dark areas in FIG. 3, can be observed between the residual droplet forms. These voids are interconnected through the thickness of the coating resulting in a porous and acoustically transparent coating. Voids or pores in FIG. 3 are generally less than 0.5 mm in size so that at ceiling height they are not readily observable by a person standing on the associated floor. The low absorption rate of the major solids volume of the coating, in the Table 1 formula afforded by the 3M K1 large particles, assures that the coating will be fast-drying. The shear thinning property of the wet coating allows it to be readily sprayed in droplet form.

The combination of high viscosity and fast drying properties enables the droplets to beneficially retain their individuality and avoid completely merging with adjacent droplets. The disclosed formulation of Table 1 applied in the specified layers dries to the extent that it will not transfer to a finger, i.e. is dry to the touch, most preferably after 20 minutes for a first coat and 30 minutes on subsequent coats in an environment of 75 degrees F. and 50% relative humidity. Preferably, alternative formulations with fast drying properties will dry to the touch in 60 minutes in a first coat. This fast drying property of the coating is also important since it enables a painter to complete a job on the same day.

Figure 5:
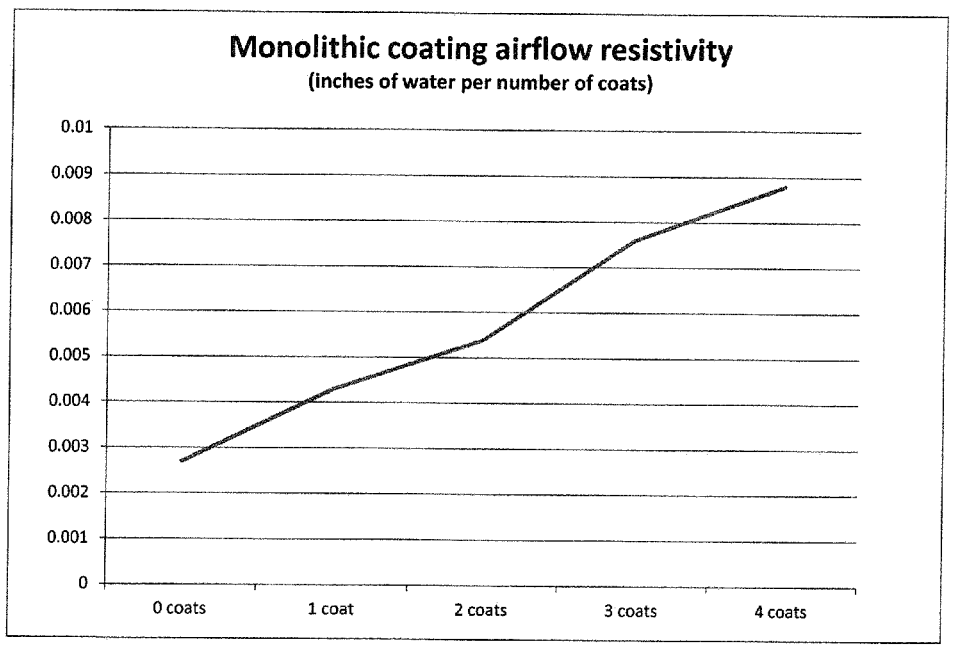
FIG. 5 is a graph of the air flow resistivity of the inventive coating.

FIG. 5 illustrates the airflow resistivity as measured separately for each successive dry coat of the Table 1 material. The resistivity was determined with an air flow of 2 liters per minute through a surface area of 3.14 square inches. The total dry thickness of the coating tested in FIG. 5 was 0.031 inch. The initial resistivity reading at "0 coats" is a measure of the resistivity of the veil 29. The dry coating is preferably between 0.03 and 0.15 inches thick.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A formulation for an acoustically transparent coating for use on an acoustical substrate comprising a water dispersible binder and relatively large filler particles, and characterized by a high pigment to volume concentration, high viscosity, high shear thinning, and fast drying to enable the formulation to be sprayed in droplets that retain their identity when in mutual contact.

2. A formulation as set forth in claim 1, that exhibits a viscosity at room temperature of between 66 and 1450 BBU.

3. A formulation as set forth in claim 1, wherein the large filler particles have a size of between 20 and 900 microns.

4. A formulation as set forth in claim 1, wherein the pigment to volume concentration is between 40% and 99%.

5. A formulation as set forth in claim 1, wherein a sprayed layer of the formulation deposited at a rate of one-quarter gallon per 25 square feet in an environment of 75 degrees F. and 50% relative humidity is dry to the touch in 30 minutes.

6. A formulation as set forth in claim 1, wherein the large filler particles have a low oil absorption rate.

7. A formulation as set forth in claim 1, wherein the large filler particles are hollow spheres of soda-lime borosilicate glass of an average size of 65 microns.

8. A formulation as set forth in claim 7, wherein the binder is a latex.

9. A method of coating an acoustical substrate with an acoustically transparent material comprising the steps of spraying the formulation of claim 1 on the substrate in droplet form at a rate that permits the droplets to dry by evaporation of water before the droplets merge substantially fully together whereby voids remain between the dried droplets.

10. A method as set forth in claim 9, wherein the droplets are sprayed with a droplet size greater than 1 mm.

11. A monolithic acoustical ceiling, comprising a plurality of perforated drywall sheets covered with an acoustical veil and in abutted relation, joints between the sheets being covered with joint tape and joint compound, a multi-layer coating of the formulation of claim 1 formed of sprayed droplets deposited in a manner in which the droplets contact adjacent droplets while they retain their identity and leave voids throughout a thickness of the coating.

12. An acoustically transparent coating on an acoustical substrate comprising multiple layers of dried droplets bound to the substrate and to adjacent droplets, the droplets having sufficient portions free of contact with adjacent droplets to provide interconnected pores that extend through a full thickness of the coating.

13. An acoustically transparent coating as set forth in claim 12, wherein the dried droplets have an average size between about ½ and 2½ mm.

14. An acoustically transparent coating as set forth in claim 12, wherein the coating is between 0.03 inches and 0.15 inches thick.

15. An acoustically transparent coating as set forth in claim 12, wherein the droplets include a dried water dispersible binder and relatively large three dimensional particles.

16. An acoustically transparent coating as set forth in claim 15, wherein the relatively large particles are between 20 and 900 microns in size.

* * * * *